(12) United States Patent
Kumagai et al.

(10) Patent No.: US 8,961,884 B2
(45) Date of Patent: Feb. 24, 2015

(54) ELECTRIC HEATING CATALYST

(75) Inventors: Noriaki Kumagai, Susono (JP);
Mamoru Yoshioka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 24 days.

(21) Appl. No.: 13/980,975

(22) PCT Filed: Feb. 14, 2011

(86) PCT No.: PCT/JP2011/053037
§ 371 (c)(1),
(2), (4) Date: Jul. 22, 2013

(87) PCT Pub. No.: WO2012/111071
PCT Pub. Date: Aug. 23, 2012

(65) Prior Publication Data
US 2013/0306623 A1    Nov. 21, 2013

(51) Int. Cl.
*B01D 50/00* (2006.01)
(52) U.S. Cl.
USPC .......................................... 422/174; 422/177
(58) Field of Classification Search
USPC .......... 422/174, 177, 180; 55/523; 219/69.15, 219/85.16
See application file for complete search history.

(56) References Cited

U.S. PATENT DOCUMENTS 5,070,694 A * 12/1991 Whittenberger ................ 60/300
2009/0184100 A1   7/2009 Ohmi et al.

FOREIGN PATENT DOCUMENTS

| GB | 2425073 A | * 10/2006 |
| JP | 05 269387 | 10/1993 |
| JP | 2007 016739 | 1/2007 |
| JP | 2007 292199 | 11/2007 |

OTHER PUBLICATIONS

International Search Report Issued Apr. 5, 2011 in PCT/JP11/053037 Filed Feb. 14, 2011.

* cited by examiner

*Primary Examiner* — Tom Duong
(74) *Attorney, Agent, or Firm* — Oblon, Spivak, McClelland, Maier & Neustadt, L.L.P.

(57) ABSTRACT

The electricity is suppressed from flowing through a case (5) of an electric heating catalyst (1). The electric heating catalyst (1) comprises a heat generating element (3) which generates heat by applying electricity; a case (5) which accommodates the heat generating element (3); an inner tube (4) which is provided between the heat generating element (3) and the case (5); and a mat (6) which is provided between the heat generating element (3) and the inner tube (4) and between the inner tube (4) and the case (5) and which insulates the electricity; wherein the inner tube (4) protrudes from the mat (6) toward an upstream side and a downstream side in a flow direction of an exhaust gas, the inner tube (4) is composed of at least two substances having different thermal conductivities, the substance (42) having the lower thermal conductivity is arranged on an inner side as compared with a surface, and the substance (41) having the higher thermal conductivity is arranged to surround the substance having the lower thermal conductivity.

4 Claims, 8 Drawing Sheets

Fig. 9 ively low temperatures. However, in a case like this, it is feared that the harmful substance may be increased. Therefore, it is difficult to greatly increase the oxygen concentration.

ELECTRIC HEATING CATALYST

TECHNICAL FIELD

The present invention relates to an electric heating catalyst.

BACKGROUND ART

A technique is known, in which a mat composed of an insulator is provided between a catalyst carrier which generates the heat by applying the electricity and a case which accommodates the catalyst carrier (see, for example, Patent Document 1). According to this mat, it is possible to suppress the electricity from flowing through the case when the electricity is applied to the catalyst carrier. However, when the particulate matter (PM) contained in an exhaust gas adheres to the mat, it is feared that the electricity may flow through the case by the aid of PM. On the other hand, water contained in an exhaust gas is sometimes condensed on a wall surface of an exhaust tube, for example, immediately after the startup of an internal combustion engine. Water, which is in a liquid form, is allowed to flow toward the downstream side by being pushed by the exhaust gas, and water arrives at the catalyst. If water in the liquid form invades the inside of the mat, and water arrives at an electrode, then the insulation resistance between the electrode and the case is lowered. Therefore, it is feared that the electricity may flow from the electrode to the case.

On the other hand, a technique is known, in which an electric heater is arranged along an outer wall of an exhaust tube of a vacuum apparatus, and a heat resistant vacuum heat insulating material is wound around the outer circumference of the electric heater (see, for example, Patent Document 2).

Further, a technique is known, in which the air is allowed to exist between an inner tube and an outer tube of a double tube so that the temperature of an exhaust gas introduced into a catalyst is thereby maintained at a high temperature to improve the exhaust gas purification performance, and the increase in the surface temperature of an exhaust tube is suppressed (see, for example, Patent Document 3).

PRECEDING TECHNICAL DOCUMENTS

Patent Documents

Patent Document 1: JP05-269387A;
Patent Document 2: JP2007-292199A;
Patent Document 3: JP2007-016739A.

SUMMARY OF THE INVENTION

Task to Be Solved by the Invention

The present invention has been made taking the foregoing problem into consideration, an object of which is to suppress the electricity from flowing through a case of an electric heating catalyst.

Solution for the Task

In order to achieve the object as described above, according to the present invention, there is provided an electric heating catalyst comprising:
a heat generating element which generates heat by applying electricity;
a case which accommodates the heat generating element;
an inner tube which is provided between the heat generating element and the case; and
a mat which is provided between the heat generating element and the inner tube and between the inner tube and the case and which insulates the electricity, wherein:
the inner tube protrudes from the mat toward an upstream side and a downstream side in a flow direction of an exhaust gas, the inner tube is composed of at least two substances having different thermal conductivities, the substance having the lower thermal conductivity is arranged on an inner side as compared with a surface, and the substance having the higher thermal conductivity is arranged to surround the substance having the lower thermal conductivity.

The heat generating element (heat generator) may be a carrier for a catalyst (catalyst carrier), and the heat generating element may be provided on the upstream side from the catalyst. The heat generating element generates the heat by applying the electricity to the heat generating element. Accordingly, it is possible to raise the temperature of the catalyst. The inner tube (inner pipe) divides the mat into the part disposed on the case side and the part disposed on the heat generating element side. Further, the inner tube is supported by the mat. Therefore, the inner tube is not brought in contact with the heat generating element and the case.

Water is contained in the exhaust gas of an internal combustion engine. Therefore, water is sometimes condensed, for example, on the case. The water flows along the inner surface of the case, and the water adheres to the mat. After that, the water is absorbed by the mat. In this arrangement, the inner tube protrudes from the mat toward the upstream side and the downstream side in the flow direction of the exhaust gas, and thus the water, which flows along the inner surface of the case, hardly flows toward the heat generating element beyond the inner tube. Therefore, it is possible to suppress the formation of any short circuit between the heat generating element and the case at the upstream side end portion and the downstream side end portion of the heat generating element. Further, the temperature tends to increase at the portions at which the inner tube protrudes from the mat. Therefore, even when the particulate matter contained in the exhaust gas adheres, the particulate matter is oxidized with ease. Accordingly, it is possible to suppress the short circuit formation which would be otherwise caused by the particulate matter adhered to the upstream side end portion and the downstream side end portion of the mat.

In the meantime, when the temperature of the exhaust gas is low, the particulate matter is deposited in some cases on the portion of the inner tube allowed to protrude from the mat. The particulate matter can be oxidized at a lower temperature when the higher oxygen concentration is provided. Therefore, when the steady operation is performed in the vicinity of the theoretical air-fuel ratio, the particulate matter is hardly oxidized, because the oxygen concentration is low and the exhaust gas temperature is low. On the other hand, even when the exhaust gas temperature is low, the particulate matter can be oxidized when the operation is performed at the lean air-fuel ratio or when the fuel cut is performed during the deceleration, because the oxygen concentration in the exhaust gas is high. However, when the internal combustion engine is operated at the lean air-fuel ratio, it is feared that the harmful substance contained in the exhaust gas may be increased. Therefore, it is difficult to greatly increase the oxygen concentration. When the fuel cut is performed during the deceleration, then the oxygen concentration can be greatly increased, but the temperature of the exhaust gas is lowered. Therefore, it is difficult to oxidize the particulate matter.

On the other hand, when the thermal conductivity is higher on the surface side as compared with the inner side in relation to the inside of the wall of the inner tube, then it is possible to contemplate the temperature increase of the inner tube from the startup to the acceleration of the internal combustion engine, and it is possible to suppress the temperature decrease of the inner tube during the deceleration. That is, the heat, which is obtained by the inner tube from the exhaust gas during the startup and the acceleration of the internal combustion engine, is allowed to conduct principally on the surface side on which the substance having the higher thermal conductivity is arranged. Therefore, the surface temperature of the inner tube is raised. On the other hand, the heat is deprived from the inner tube by the exhaust gas having the low temperature during the deceleration. Therefore, the temperature of the surface of the inner tube is lowered. In this context, the exhaust gas is allowed to flow principally on the side of the inner circumferential surface of the inner tube (surface which is included in the surface of the inner tube and which is directed to the heat generating element). Therefore, the temperature of the inner circumferential surface of the inner tube tends to be lowered during the deceleration. However, the flow amount of the exhaust gas is small on the side of the outer circumferential surface of the inner tube (surface which is included in the surface of the inner tube and which is directed to the case). Further, the thermal conductivity is low at the inside of the inner tube. Therefore, the outer circumferential surface side of the inner tube is hardly affected by the temperature decrease on the inner circumferential surface side of the inner tube. Therefore, the temperature on the outer circumferential surface side is hardly lowered as compared with the inner circumferential surface side of the inner tube. In this way, it is possible to suppress the decrease in the temperature on the outer circumferential surface side of the inner tube. Therefore, the particulate matter, which adheres to the outer circumferential surface of the inner tube, can be also oxidized during the deceleration in which the oxygen concentration in the exhaust gas is high. Therefore, it is possible to suppress the electricity from flowing through the surface of the inner tube.

In the present invention, the electric heating catalyst may further comprise:
  an electrode which is connected to the heat generating element from outside of the case; and
  an electrode chamber which is a space formed around the electrode between the case and the heat generating element and which is formed by providing a gap between the electrode and the mat and the inner tube, wherein:
  the inner tube has a portion which is disposed around the electrode chamber and which is composed of only the substance having the higher thermal conductivity.

In this arrangement, the water, which is absorbed by the mat, is moved in the mat. However, the movement of water from the case side to the heat generating element side is intercepted or blocked by the inner tube. Accordingly, it is possible to suppress the short circuit formation which would be otherwise caused by water. Further, the water, which is absorbed by the mat, is evaporated by the heat of the exhaust gas or the heat of the heat generating element. Therefore, the water is removed when the time elapses.

However, if the water, which is absorbed by the mat, arrives at the electrode chamber, it is difficult to remove the water from the inside of the electrode chamber. If the water remains in the electrode chamber, it is feared that the short circuit may be formed. In order to remove the water contained in the electrode chamber, it is effective to raise the temperature of the electrode chamber. However, if the heat insulating effect of the inner tube is high, it is difficult to increase the temperature of the electrode chamber. In relation thereto, when the surrounding of the electrode chamber is previously composed of only the substance having the higher thermal conductivity, it is possible to supply larger amounts of the heat generated in the heat generating element and the heat of the exhaust gas into the electrode chamber. Therefore, it is possible to quickly raise the temperature in the electrode chamber. Accordingly, it is possible to evaporate the water contained in the electrode chamber, and it is possible to quickly remove the water. In another viewpoint, the distance, which ranges from the substance having the lower thermal conductivity to the electrode chamber, may be longer than the distance which ranges from the substance having the lower thermal conductivity to the upstream side end portion of the inner tube.

In the present invention, the inner tube may have a portion which is composed of only the substance having the higher thermal conductivity, the substance having the lower thermal conductivity may be arranged on the inner side as compared with the surface on the upstream side from the portion, and the substance having the higher thermal conductivity may be arranged to surround the substance having the lower thermal conductivity.

In this arrangement, as for the inner tube, the degree of decrease in the temperature is large during the deceleration on the upstream side as compared with the downstream side. That is, the temperature tends to decrease with ease at the portion of the inner tube disposed on the upstream side on account of the flow of the exhaust gas having the low temperature during the deceleration. On the other hand, the portion of the inner tube, which is disposed on the downstream side, can receive the heat from the heat generating element, even when the exhaust gas allowed to inflow into the heat generating element has the low temperature. The heat generating element has the large thermal capacity, and hence the temperature is hardly lowered even when the exhaust gas having the low temperature passes therethrough. Therefore, the temperature is hardly lowered at the portion of the inner tube disposed on the downstream side. Further, the amount of the exhaust gas is small during the deceleration. Therefore, the heat, which is released from the case to the outside, has the relatively large influence. Therefore, the temperature of the outer circumferential surface of the inner tube tends to be lowered. Therefore, it is favorable that the thermal conductivity at the inside of the inner tube is made relatively high at the portion of the inner tube disposed on the downstream side so that the decrease in the temperature of the outer circumferential surface of the inner tube is suppressed. On the other hand, the overheat tends to occur due to the heat of the heat generating element on the downstream side of the inner tube. However, the overheat can be suppressed by relatively increasing the thermal conductivity at the inside of the inner tube.

In the present invention, the electric heating catalyst, may further comprise:
  an electrode which is connected to the heat generating element from outside of the case; and
  an electrode chamber which is a space formed around the electrode between the case and the heat generating element and which is formed by providing a gap between the electrode and the mat and the inner tube, wherein:
  a portion of the inner tube, which is disposed on the downstream side from the electrode chamber, is composed of only the substance having the higher thermal conductivity.

In this way, the inner tube is divided into the portion disposed on the upstream side from the electrode chamber and the portion disposed on the downstream side from the electrode chamber. Accordingly, it is possible to suppress the increase in the cost upon the production.

Effect of the Invention

According to the present invention, it is possible to suppress the electricity from flowing through the case of the electric heating catalyst.

MODE FOR CARRYING OUT THE INVENTION

Specified embodiments of the electric heating catalyst according to the present invention will be explained below on the basis of the drawings. The following embodiments can be appropriately combined with each other.

First Embodiment

Figure 1:
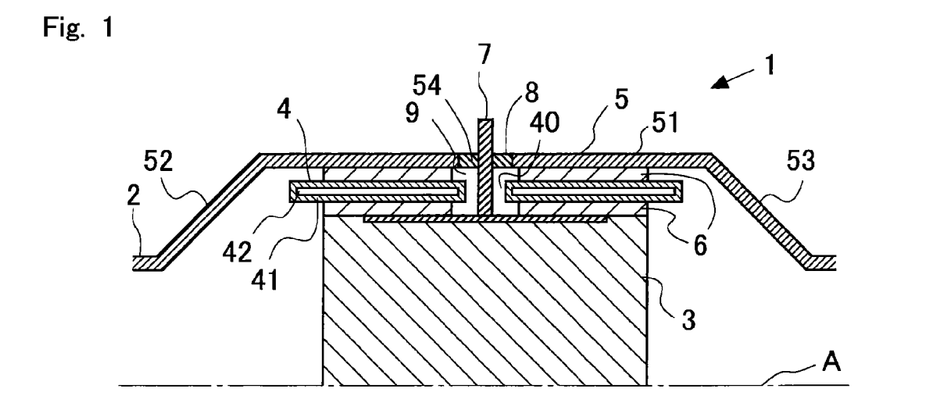
FIG. 1 shows a schematic arrangement of an electric heating catalyst according to a first embodiment.

FIG. 1 shows a schematic arrangement of an electric heating catalyst 1 according to this first embodiment. The electric heating catalyst 1 according to this embodiment is provided for an exhaust tube 2 of an internal combustion engine carried on a vehicle. The internal combustion engine may be either a diesel engine or a gasoline engine. Further, the electric heating catalyst 1 can be also used for a vehicle which adopts a hybrid system provided with an electric motor.

The electric heating catalyst 1 shown in FIG. 1 is depicted in a sectional view obtained by cutting the electric heating catalyst 1 in the vertical direction along the central axis A of the exhaust tube 2. The shape of the electric heating catalyst 1 is linearly symmetric with respect to the central axis A. Therefore, only an upper part is shown in FIG. 1.

The electric heating catalyst 1 according to this embodiment comprises a columnar or cylindrical catalyst carrier 3 which has the center of the central axis A. The catalyst carrier 3, an inner tube 4, and a case 5 are provided in this order as referred to from the side of the central axis A. A mat 6 is provided between the catalyst carrier 3 and the inner tube 4 and between the inner tube 4 and the case 5.

A material, which behaves as an electric resistor and which generates the heat by applying the electricity, is used for the catalyst carrier 3. For example, SiC is used as the material of the catalyst carrier 3. The catalyst carrier 3 has a plurality of passages which extend in the direction of the flow of the exhaust gas (i.e., in the direction of the central axis A) and which have a honeycomb-shaped form provided in the cross section perpendicular to the direction of the flow of the exhaust gas. The exhaust gas flows through the passages. The outer shape of the catalyst carrier 3 is, for example, a columnar shape provided about the center of the central axis A of the exhaust tube 2. The cross-sectional shape of the catalyst carrier 3, which is taken along the cross section perpendicular to the central axis A, may be, for example, elliptic. The central axis A is the common central axis of the exhaust tube 2, the catalyst carrier 3, the inner tube 4, and the case 5.

The catalyst is carried on the catalyst carrier 3. The catalyst may be exemplified, for example, by the oxidation catalyst, the three way catalyst, the absorption reduction type NOx catalyst, and the selective reduction type NOx catalyst. Two electrodes 7 are connected to the catalyst carrier 3. The electricity is applied to the catalyst carrier 3 by applying the voltage between the electrodes 7. The catalyst carrier 3 generates the heat in accordance with the electric resistance of the catalyst carrier 3. In this embodiment, the catalyst carrier 3 corresponds to the heat generating element according to the present invention. Even when the heat generating element is provided on the upstream side from the catalyst, this embodiment can be applied equivalently.

An electrically insulating material is used for the mat 6. For example, a ceramic fiber, which contains a main component of alumina, is used therefor. The mat 6 is wound around the outer circumferential surface of the catalyst carrier 3 and the outer circumferential surface of the inner tube 4. The mat 6 covers the outer circumferential surface of the catalyst carrier 3 (surface parallel to the central axis A). Therefore, the mat 6 suppresses the electricity from flowing through the inner tube 4 and the case 5 when the electricity is applied to the catalyst carrier 3.

A stainless steel material is used for the material of the inner tube 4. The inner tube 4 is formed to have a tube-shaped form about the center of the central axis A. The length in the direction of the central axis A of the inner tube 4 is longer than that of the mat 6. Therefore, the inner tube 4 protrudes from the mat 6 to the upstream side and the downstream side. The inner diameter of the inner tube 4 is substantially the same as the outer diameter of the mat 6 provided when the outer circumference of the catalyst carrier 3 is covered with the mat 6. When the mat 6 and the catalyst carrier 3 are accommodated in the inner tube 4, the mat 6 is compressed. Therefore, the catalyst carrier 3 is fixed at the inside of the inner tube 4 by means of the repulsive force of the mat 6.

Figure 2:
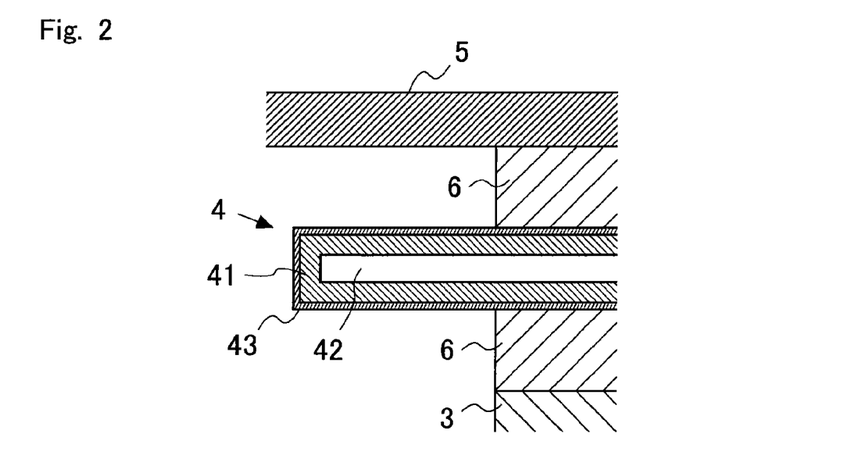
FIG. 2 shows an enlarged view illustrating a cross section of an inner tube.

In this context, FIG. 2 shows an enlarged view of the cross section of the inner tube 4. The inner tube 4 is constructed to include an outer layer 41, an inner layer 42, and an insulating layer 43. The inner layer 42 is arranged at the inside of the cross section of the inner tube 4. The entire circumference of the inner layer 42 is surrounded by the outer layer 41, and the entire circumference of the outer layer 41 is surrounded by the insulating layer 43. A material, which has the thermal conductivity higher than that of the inner layer 42, is used for the outer layer 41. Any one of the gas, the liquid, and the solid can be used for the inner layer 42. For example, the air can be used for the inner layer 42, and a stainless steel material can be used for the outer layer 41. In this arrangement, the cross section of the inner tube 4 provides a hollow structure in which the layer of air (inner layer 42) is surrounded by the layer of stainless steel material (outer layer 41). Any other material can be also used provided that the thermal conductivity of the outer layer 41 is higher than that of the inner layer 42. The insulating layer 43 is formed, for example, such that an electrically insulating member of ceramic or the like is applied to the outer layer 41. In this embodiment, the stainless steel material is selected as the outer layer 41, and the air is selected as the inner layer 42.

A metal is used as the material of the case 5. It is possible to use, for example, a stainless steel material. The case 5 is constructed to include an accommodating portion 51 which is constructed to include a curved surface parallel to the central axis A, and tapered portions 52, 53 which connect the accommodating portion 51 and the exhaust tube 2 on the upstream side and the downstream side from the accommodating portion 51. The catalyst carrier 3, the inner tube 4, and the mat 6 are accommodated at the inside of the accommodating portion 51. Each of the tapered portions 52, 53 has such a tapered shape that the cross-sectional area of the passage is decreased at positions separated farther from the accommodating portion 51. That is, the cross-sectional area is decreased on the more upstream side in relation to the tapered portion 52 disposed on the upstream side from the catalyst carrier 3. The cross-sectional area is decreased on the more downstream side in relation to the tapered portion 53 disposed on the downstream side from the catalyst carrier 3. The inner diameter of the accommodating portion 51 is substantially the same as the outer diameter of the mat 6 provided when the outer circumference of the inner tube 4 is covered with the mat 6. When the mat 6 and the inner tube 4 are accommodated in the accommodating portion 51, the mat 6 is compressed. Therefore, the inner tube 4 is fixed at the inside of the accommodating portion 51 by means of the repulsive force of the mat 6.

The two electrodes 7 are connected to the catalyst carrier 3. In order to allow the electrodes 7 to pass, holes 40, 54 are provided through the inner tube 4 and the case 5. The inner layer 42 is surrounded by the outer layer 41 and the outer layer 41 is surrounded by the insulating layer 43 also in the hole 40 provided for the inner tube 4. Further, the mat 6 is not provided around the electrodes 7 until the electrodes 7 are connected to the catalyst carrier 3. An insulating material 8, which supports the electrode 7, is provided in the hole 54 bored through the case 5. The insulating material 8 is provided without forming any gap between the case 5 and the electrode 7. In this way, an electrode chamber 9, which is the space closed around the electrode 7, is formed in the case 5. The inner tube 4 may be divided into a part disposed on the upstream side and a part disposed on the downstream side with respect to the electrode chamber 9, and the respective parts may be installed separately. Further, the mat 6 may be also divided into a part disposed on the upstream side and a part disposed on the downstream side with respect to the electrode chamber 9, and the respective parts may be installed separately. Accordingly, the electrode chamber 9 makes a round around the catalyst carrier 3.

In the electric heating catalyst 1 constructed as described above, the water, which is condensed on the upstream side from the catalyst carrier 3, flows along the inner walls of the exhaust tube 2 and the case 5, and the water adheres to the mat 6 in some cases. In this situation, the water flows along the inner wall of the accommodating portion 51. Therefore, the water adheres to the mat 6 disposed between the inner tube 4 and the accommodating portion 51. That is, the water is suppressed from entering the inside from the inner tube 4, because the inner tube 4 protrudes to the upstream side and the downstream side as compared with the mat 6. Accordingly, the short circuit formation is suppressed, which would be otherwise caused by the water between the case 5 and the catalyst carrier 3 at the upstream end and the downstream end of the mat 6.

If the particulate matter (hereinafter referred to as "PM"), which is contained in the exhaust gas, adheres to the mat 6 and/or the inner tube 4, it is feared that the short circuit may be formed by PM between the case 5 and the catalyst carrier 3. However, the inner tube 4 protrudes from the mat 6, and thus the heat of the exhaust gas is received to raise the temperature at the protruding portion. Therefore, PM, which adheres to the inner tube 4, can be oxidized and removed. Accordingly, the short circuit formation is suppressed, which would be otherwise caused by PM between the case 5 and the catalyst carrier 3.

In the electric heating catalyst 1 constructed as described above, the surface temperature of the inner tube 4 is quickly raised by the heat received by the inner tube 4 from the exhaust gas during the startup or the acceleration of the internal combustion engine.

Figure 3:
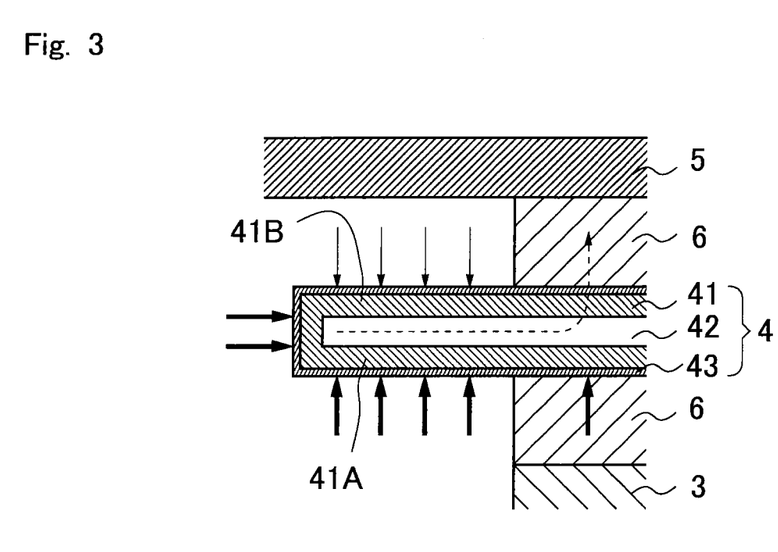
FIG. 3 shows a situation of the transfer of heat during the acceleration.

FIG. 3 shows a situation of the transfer of heat during the acceleration. The exhaust gas principally flows on the side of the catalyst carrier 3 as compared with the inner tube 4. Therefore, a larger amount of heat is received on the inner circumferential surface side 41A as compared with the outer circumferential surface side 41B of the inner tube 4 during the acceleration. The inner circumferential surface side 41A of the inner tube 4 also receives the heat from the catalyst carrier 3. In FIG. 3, the magnitude of heat to be received is indicated by the thickness of the arrow. The heat is transferred along the outer layer 41 having the relatively high thermal conductivity. On the other hand, the inner layer 42, which has the relatively low thermal conductivity, is present. Therefore, the heat is suppressed from the movement along the inner layer 42, and the heat is suppressed from the transfer to the case 5 from the inner circumferential surface side 41A of the inner tube 4 (see the broken line shown in FIG. 3). Therefore, the temperature is quickly raised on the inner circumferential surface side 41A of the inner tube 4, and the temperature becomes higher.

If both of the outer layer 41 and the inner layer 42 of the inner tube 4 are composed of the stainless steel material, the heat is easily transferred to the inner layer 42 from the inner circumferential surface side 41A of the inner tube 4. Therefore, the heat is easily released to the case 5 via the mat 6 disposed between the inner tube 4 and the case 5. Therefore, the surface temperature of the inner tube 4 is hardly raised.

On the other hand, in order to oxidize PM adhered to the surface of the inner tube 4, it is desirable that the surface temperature of the inner tube 4 is high when the oxygen concentration in the exhaust gas is high. In this context, the oxygen concentration in the exhaust gas is high when the fuel cut is performed during the deceleration. Therefore, if the surface temperature of the inner tube 4 is high in this situation, it is possible to oxidize PM.

However, when the fuel cut is performed during the deceleration, then the temperature of the exhaust gas is low, and hence the surface temperature of the inner tube 4 tends to lower. The temperature decrease is conspicuous on the inner circumferential surface side 41A of the inner tube 4 on which a larger amount of the exhaust gas flows. In relation thereto, the inner tube 4 is provided with the inner layer 42. Therefore, even when the surface temperature is lowered on the inner circumferential surface side 41A of the inner tube 4, it is possible to suppress the temperature decrease on the outer circumferential surface side 41B of the inner tube 4 owing to the heat insulating effect of the inner layer 42.

Figure 4:
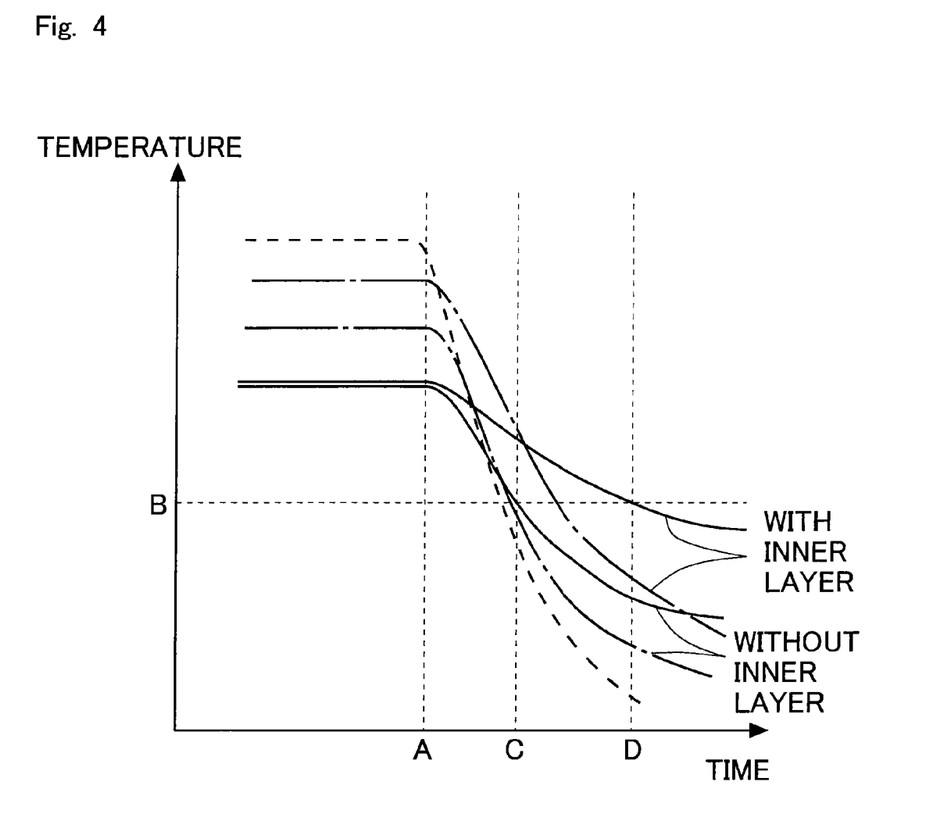
FIG. 4 shows a time chart illustrating the transition of the temperature on the inner circumferential surface side of the inner tube and the temperature on the outer circumferential surface side.

FIG. 4 shows a time chart illustrating the transition of the temperature on the inner circumferential surface side 41A of the inner tube 4 and the temperature on the outer circumferential surface side 41B. The steady operation is performed before the time indicated by A. The deceleration is effected and the fuel cut is performed after the time indicated by A. The expression of "with inner layer" represents each of the cases in which the stainless steel material is used for the outer layer 41 of the inner tube 4 and the air is used for the inner layer 42. The expression of "without inner layer" represents each of the cases in which the stainless steel material is used for the outer layer 41 and the inner layer 42 of the inner tube 4. The solid line indicates each of the temperatures on the outer circumferential surface side 41B of the inner tube 4, the alternate long and short dash line indicates each of the temperatures on the inner circumferential surface side 41A of the inner tube 4, and the broken line indicates the temperature of the exhaust gas allowed to inflow into the electric heating catalyst 1. The temperature indicated by B is the lower limit value of the temperature at which PM can be oxidized.

When the comparison is made between the case of "with inner layer" and the case of "without inner layer" in relation to the temperatures (alternate long and short dash lines) on the inner circumferential surface side 41A of the inner tube 4, the temperature is high in the case of "with inner layer" as compared with the case of "without inner layer" before the time indicated by A. Accordingly, PM is oxidized more easily in the case of "with inner layer".

Subsequently, the comparison is made between the case of "with inner layer" and the case of "without inner layer" in relation to the temperatures (solid lines) on the outer circumferential surface side 41B of the inner tube 4. In the case of "without inner layer", the temperature indicated by B is provided at the time indicated by C. That is, in the case of "without inner layer", PM can be oxidized in the period of time ranging from A to C. On the other hand, in the case of "with inner layer", the temperature indicated by B is provided at the time indicated by D. That is, in the case of "with inner layer", PM can be oxidized in the period of time ranging from A to D. As described above, the period of time, in which PM can be oxidized during the fuel cut, can be more prolonged in the case of "with inner layer". Accordingly, it is possible to suppress the deposition of PM on the inner tube 4.

As explained above, according to this embodiment, it is possible to facilitate the temperature increase of the inner tube 4, and it is possible to suppress the temperature decrease of the inner tube 4 during the fuel cut by lowering the thermal conductivity of the inner layer 42 of the inner tube 4 as compared with the thermal conductivity of the outer layer 41. That is, the temperature on the inner circumferential surface side 41A of the inner tube 4 can be more raised during the acceleration owing to the heat insulating effect brought about by the inner layer 42. During the deceleration, the temperature decrease is suppressed on the outer circumferential surface side 41B of the inner tube 4. Therefore, it is possible to facilitate the oxidation of PM on the outer circumferential surface side 41B. Further, almost all of the exhaust gas flows on the side of the central axis A as compared with the inner tube 4. Therefore, the amount of adhesion of PM is small on the outer circumferential surface side 41B of the inner tube 4 as compared with the inner circumferential surface side 41A. Therefore, the suppression of the temperature decrease on the outer circumferential surface side 41B of the inner tube 4 is the effective means to suppress the short circuit formation.

Second Embodiment

Figure 5:
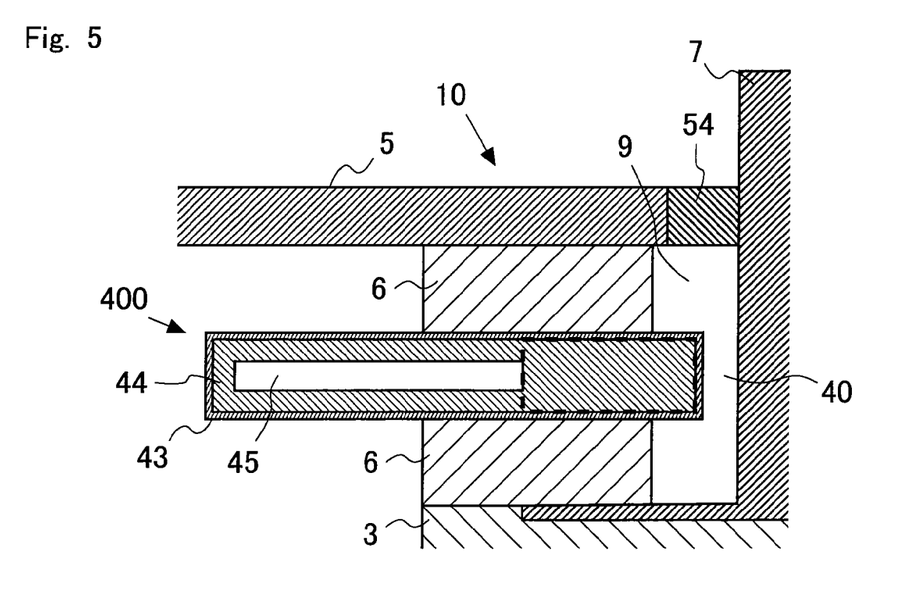
FIG. 5 shows a schematic arrangement of an electric heating catalyst according to a second embodiment.

FIG. 5 shows a schematic arrangement of an electric heating catalyst 10 according to this second embodiment. An explanation will be made about points or features different from those of the electric heating catalyst 1 shown in the first embodiment. The members, which are the same as those of the electric heating catalyst 1 shown in the first embodiment, are designated by the same reference numerals.

The water, which adheres to the mat 6, is evaporated by the heat of the exhaust gas and the heat of the catalyst carrier 3. However, if the amount of water adhered to the mat 6 is increased, then a part thereof is not evaporated immediately, and the part of water stays in the mat 6. The water passes through the mat 6 to arrive at the electrode chamber 9 disposed around the electrode 7, and the water stays in the electrode chamber 9 in some cases. The water, which exists in the electrode chamber 9 as described above, is hardly removed, even when the evaporation is caused. If water vapor or steam exists in the electrode chamber 9, the insulation resistance between the electrode 7 and the case 5 is greatly lowered. If such a situation arises, it is feared that the electricity cannot be applied, when it is requested to raise the temperature of the catalyst carrier 3.

If the thermal conductivity, which is provided at the inside of the inner tube 4, is lowered as in the first embodiment, then the heat is hardly transferred from the catalyst carrier 3 to the electrode chamber 9, and hence the temperature of the electrode chamber 9 is hardly raised. Therefore, the water tends to remain at the inside of the electrode chamber 9 with ease. In relation thereto, in the second embodiment, an inner tube 400 has a structure which is different from the structure provided in the first embodiment.

That is, a portion of the inner tube 400, which is disposed around the electrode chamber 9 (area surrounded by broken lines shown in FIG. 5), is composed of only the substance having the higher thermal conductivity. That is, the distance from an inner layer 45 to the electrode chamber 9 is longer than that in the first embodiment. The feature may be represented such that the area of the inner layer 45 is decreased in the direction to make separation from the electrode chamber 9, or the area of an outer layer 44 is increased in the direction to make separation from the electrode chamber 9. In another viewpoint, the feature may be represented such that the distance from the inner layer 45 to the electrode chamber 9 is longer than the distance from the inner layer 45 to the upstream side end portion of the inner tube 400. In still another viewpoint, the feature may be represented such that the thermal conductivity is identical between the inner layer 45 and the outer layer 44 around the electrode chamber 9 in relation to the inner tube 400. When a hollow member is used for the inner tube 400, it is also appropriate that the surrounding of the electrode chamber 9 is not hollow, and the surrounding of the electrode chamber 9 is composed of a material (for example, a stainless steel material) having a relatively high thermal conductivity. The range of construction with only the substance having the high thermal conductivity is set so that the temperature in the electrode chamber 9 can be raised to the temperature required to remove water. Further, the setting may be made such that PM adhered to the inner tube 400 can be removed. The thermal conductivity of the inner layer 45 may be higher than that of the outer layer 44 around the electrode chamber 9 in relation to the inner tube 400.

When the arrangement is provided as described above, it is possible to increase the amount of heat transferred from the catalyst carrier 3 to the electrode chamber 9. That is, it is possible to transfer, to the electrode chamber 9, the larger amounts of, for example, the heat of the exhaust gas, the heat generated by the reaction of unburned fuel on the catalyst, and the heat generated by the application of the electricity. Accordingly, the temperature in the electrode chamber 9 can be quickly raised to a temperature of not less than the dew point temperature. Therefore, it is possible to suppress the decrease in the insulation performance which would be otherwise caused by the condensed water.

Third Embodiment

Figure 6:
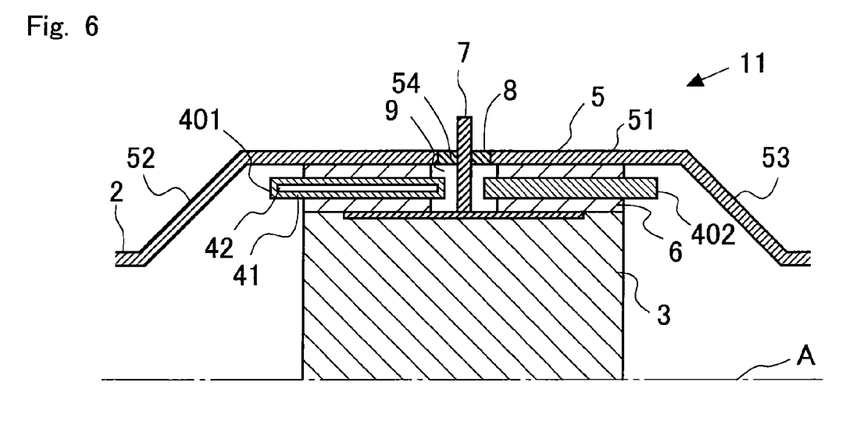
FIG. 6 shows a schematic arrangement of an electric heating catalyst according to a third embodiment.

FIG. 6 shows a schematic arrangement of an electric heating catalyst 11 according to this third embodiment. An explanation will be made about points or features different from those of the electric heating catalyst 1 shown in the first embodiment. The members, which are the same as those of the electric heating catalyst 1 shown in the first embodiment, are designated by the same reference numerals.

In the electric heating catalyst 11 shown in FIG. 6, the inner tube is divided into an inner tube 401 which is disposed on the upstream side from the electrode chamber 9 and an inner tube 402 which is disposed on the downstream side from the electrode chamber 9. The mat 6 is also divided into a portion disposed on the upstream side and a portion disposed on the downstream side with respect to the electrode chamber 9. Therefore, the electrode chamber 9 makes a round around the catalyst carrier 3. An insulating layer is provided in the same manner as in the first embodiment for each of the inner tube 401 disposed on the upstream side from the electrode chamber 9 and the inner tube 402 disposed on the downstream side from the electrode chamber 9. In the inner tube 401 disposed on the upstream side from the electrode chamber 9, the thermal conductivity of the inner layer 42 is lower than that of the outer layer 41. On the other hand, the inner tube 402, which is disposed on the downstream side from the electrode chamber 9, is composed of only the substance which has the same high thermal conductivity as that of the outer layer 41. The feature may be represented such that the outer layer and the inner layer have the same thermal conductivity in the inner tube 402. In this embodiment, the inner tube 402, which is disposed on the downstream side from the electrode chamber 9, corresponds to the portion which is composed of only the substance having the higher thermal conductivity according to the present invention.

Figure 7:
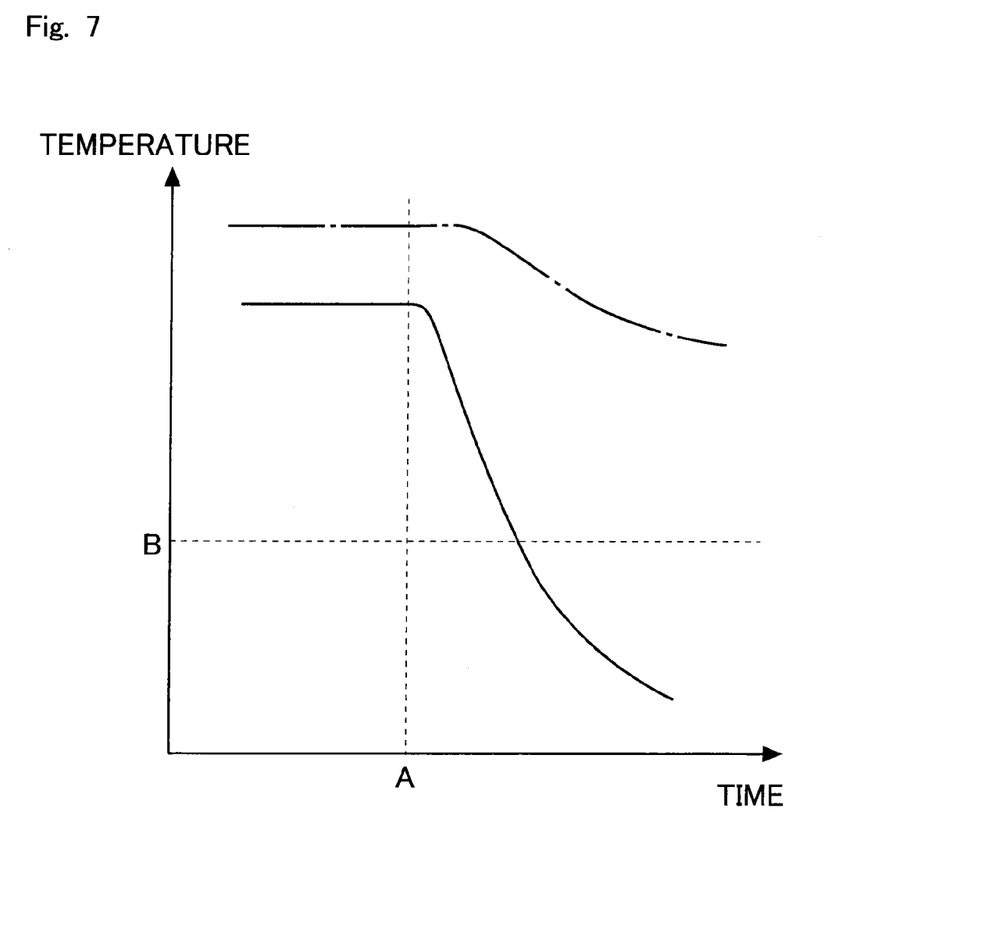
FIG. 7 shows the transition of the temperature of the exhaust gas allowed to inflow into the electric heating catalyst (solid line) and the temperature of the exhaust gas allowed to outflow from the electric heating catalyst (alternate long and short dash line).

In this context, FIG. 7 shows the transition of the temperature of the exhaust gas allowed to inflow into the electric heating catalyst 11 (solid line) and the temperature of the exhaust gas allowed to outflow from the electric heating catalyst 11 (alternate long and short dash line). The deceleration is started and the fuel cut is performed simultaneously at the time indicated by A. The temperature indicated by B is the lower limit value of the temperature at which PM can be oxidized.

The exhaust gas, which is allowed to inflow into the electric heating catalyst 11, has the temperature which is immediately lowered on account of the fuel cut, and the temperature becomes lower than the temperature indicated by B. On the other hand, the exhaust gas, which is allowed to outflow from the electric heating catalyst 11, has the temperature which takes a certain period of time until the temperature becomes lower than the temperature indicated by B. That is, the electric heating catalyst 11 has the relatively large thermal capacity. Therefore, even when the temperature of the exhaust gas allowed to inflow into the electric heating catalyst 11 is lowered, then the heat is imparted to the exhaust gas from the electric heating catalyst 11, and hence the degree of temperature decrease is small in relation to the exhaust gas allowed to outflow from the electric heating catalyst 11. Therefore, the inner tube 402, which is disposed on the downstream side from the electrode chamber 9, has the long period of time in which the temperature is not less than the temperature indicated by B, as compared with the inner tube 401 which is disposed on the upstream side from the electrode chamber 9.

Further, the flow rate of the exhaust gas is small during the fuel cut. Therefore, the influence of the temperature decrease, which is exerted by the heat release from the case 5, is relatively large. Therefore, the temperature on the outer circumferential surface side of the inner tube 402 tends to lower. For the reason as described above, it is unnecessary to provide the layer having the low thermal conductivity (for example, air layer) for the inner tube 402 disposed on the downstream side from the electrode chamber 9.

It is possible to reduce the cost by constructing the inner tube 402 with only one material (for example, stainless steel material). A larger amount of the heat is transferred from the inner circumferential surface side to the outer circumferential surface side of the inner tube 402 in relation to the inner tube 402 disposed on the downstream side from the electrode chamber 9, and thus it is possible to maintain the high temperatures on the inner circumferential surface side and the outer circumferential surface side of the inner tube 402. The heat can be released to the case 5 in relation to the inner tube 402 disposed on the downstream side, and hence it is possible to suppress the overheat of the inner tube 402. The thermal conductivity of the inner layer may be made larger than that of the outer layer in the inner tube 402 disposed on the downstream side from the electrode chamber 9. In this embodiment, the range, in which the inner layer 42 is formed, is disposed on the upstream side from the electrode chamber 9. However, the boundary can be also set on the more upstream side or the downstream side from the electrode chamber 9.

Reference Embodiment

Figure 8:
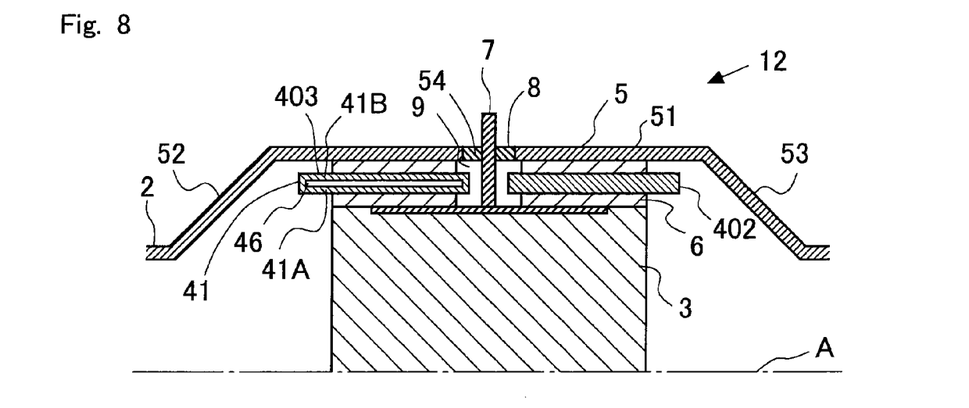
FIG. 8 shows a schematic arrangement of an electric heating catalyst concerning a reference embodiment.

FIG. 8 shows a schematic arrangement of an electric heating catalyst 12 concerning this reference embodiment. An explanation will be made about points or features different from those of the electric heating catalyst 11 shown in the third embodiment. The members, which are the same as those of the electric heating catalyst 11 shown in the third embodiment, are designated by the same reference numerals.

This reference embodiment is different from the third embodiment in relation to the following points. That is, a material, which has a specific heat higher than that of the air, is used for an inner layer 46 of an inner tube 403 disposed on the upstream side from the electrode chamber 9. Further, it is more appropriate to use a material having a specific heat and a thermal conductivity higher than those of the air. The specific heat of the stainless steel material is, for example, 0.59 (J/(g*k)), and the specific heat of the air is, for example, 1.006 (J/(g*k)). Therefore, the specific heat of the air is higher than that of the stainless steel material.

When it is intended to maintain the surface temperature of the inner tube 403 disposed on the upstream side from the electrode chamber 9, it is advantageous that the material having the higher specific heat is used for the inner layer 46 of the inner tube 403. That is, even when the surface of the inner tube 403 is cooled on account of the flow of the exhaust gas having a low temperature during the fuel cut, it is possible to supply the heat from the inner layer 46 to the outer layer 41 of the inner tube 403. Therefore, it is possible to suppress the decrease in the temperature of the outer layer 41. The inner tube 402, which is disposed on the downstream side from the electrode chamber 9, may be constructed in the same manner as described above.

Figure 9:
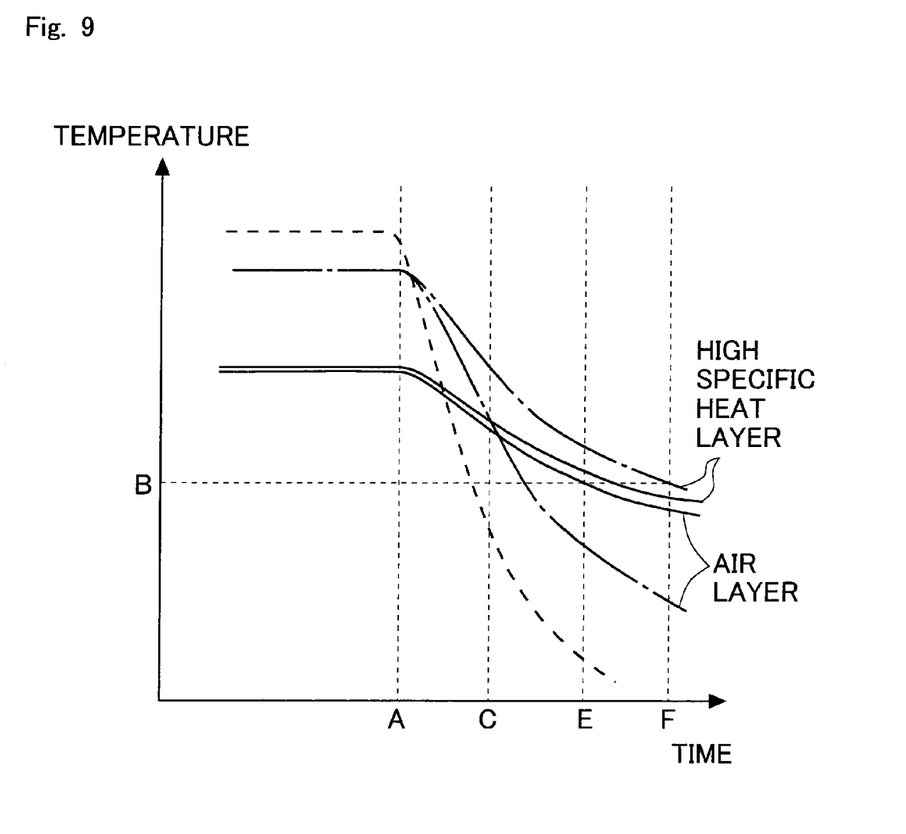
FIG. 9 shows a time chart illustrating the transition of the temperature of the inner circumferential surface of an inner tube and the temperature of the outer circumferential surface.

In this context, FIG. 9 shows a time chart illustrating the transition of the temperature on the inner circumferential surface side of the inner tube 403 and the temperature on the outer circumferential surface side. The steady operation is performed before the time indicated by A. The deceleration is effected and the fuel cut is performed after the time indicated by A. The expression of "air layer" represents each of the cases in which the air is used for the inner layer 46 of the inner tube 403. The expression of "high specific heat layer" represents each of the cases in which the material having the specific heat higher than that of the air is used for the inner layer 46 of the inner tube 403. The solid line indicates each of the temperatures on the outer circumferential surface side 41B of the inner tube 403, the alternate long and short dash line indicates each of the temperatures on the inner circumferential side 41A of the inner tube 403, and the broken line indicates the temperature of the exhaust gas allowed to inflow into the electric heating catalyst 12. The temperature indicated by B is the lower limit value of the temperature at which PM can be oxidized. The time indicated by C in FIG. 9 is the same as the time indicated by C in FIG. 4.

Any large difference is not found even when the comparison is made between the case of "air layer" and the case of "high specific heat layer" in relation to the temperatures (solid lines) on the outer circumferential surface side 41B of the inner tube 403. On the other hand, the degree of decrease in the temperature is small in the case of "high specific heat layer" when the comparison is made between the case of "air layer" and the case of "high specific heat layer" in relation to the temperatures (alternate long and short dash lines) on the inner circumferential surface side 41A of the inner tube 403. The period of time, in which the temperature is not less than the temperature indicated by B, is long on the outer circumferential surface side 41B as compared with the inner circumferential surface side 41A in the case of "air layer". That is, in the case of "air layer", the temperature on the outer circumferential surface side 41B is the temperature indicated by B at the time indicated by E. Therefore, PM can be oxidized during the period of time ranging from A to E. On the other hand, in the case of "high specific heat layer", the period of time, in which the temperature is not less than the temperature indicated by B, is long on the inner circumferential surface side 41A as compared with the outer circumferential surface side 41B. That is, in the case of "high specific heat layer", the temperature on the inner circumferential surface side 41A is the temperature indicated by B at the time indicated by F. Therefore, PM can be oxidized during the period of time ranging from A to F. That is, the period of time, in which the temperature is maintained to be not less than the temperature at which PM can be oxidized, is long in the case of "high specific heat layer" as compared with the case of "air layer". Accordingly, it is possible to suppress the deposition of PM on the inner tube 403.

As explained above, according to this reference embodiment, it is possible to suppress the decrease in the temperature on the inner circumferential surface side 41A of the inner tube 403 by further increasing the specific heat of the inner layer 46 of the inner tube 403. Therefore, it is possible to suppress the deposition of PM.

PARTS LIST

1: electric heating catalyst, 2: exhaust tube, 3: catalyst carrier, 4: inner tube, 5: case, 6: mat, 7: electrode, 8: insulating material, 9: electrode chamber, 41: outer layer, 42: inner layer.

The invention claimed is:

1. An electric heating catalyst comprising:
   a heat generating element which generates heat by applying electricity;
   a case which accommodates the heat generating element;
   an inner tube which is provided between the heat generating element and the case; and
   a mat which is provided between the heat generating element and the inner tube and between the inner tube and the case and which insulates the electricity, wherein:
   the inner tube protrudes from the mat toward an upstream side and a downstream side in a flow direction of an exhaust gas, the inner tube is composed of at least two substances having different thermal conductivities, the substance having the lower thermal conductivity is arranged on an inner side as compared with a surface, and the substance having the higher thermal conductivity is arranged to surround the substance having the lower thermal conductivity.

2. The electric heating catalyst according to claim 1, further comprising:
   an electrode which is connected to the heat generating element from outside of the case; and
   an electrode chamber which is a space formed around the electrode between the case and the heat generating element and which is formed by providing a gap between the electrode and the mat and the inner tube, wherein:
   the inner tube has a portion which is disposed around the electrode chamber and which is composed of only the substance having the higher thermal conductivity.

3. The electric heating catalyst according to claim 1, wherein the inner tube has a portion which is composed of only the substance having the higher thermal conductivity, the substance having the lower thermal conductivity is arranged on the inner side as compared with the surface on the upstream side from the portion, and the substance having the higher thermal conductivity is arranged to surround the substance having the lower thermal conductivity.

4. The electric heating catalyst according to claim 3, further comprising:
   an electrode which is connected to the heat generating element from outside of the case; and
   an electrode chamber which is a space formed around the electrode between the case and the heat generating element and which is formed by providing a gap between the electrode and the mat and the inner tube, wherein:
   a portion of the inner tube, which is disposed on the downstream side from the electrode chamber, is composed of only the substance having the higher thermal conductivity.

* * * * *